United States Patent [19]
Sherman et al.

[11] 3,916,053
[45] Oct. 28, 1975

[54] CARPET TREATING AND TREATED CARPET

[75] Inventors: Patsy O. Sherman, Bloomington; Samuel Smith, Roseville, both of Minn.

[73] Assignee: Minnesota Mining and Manufacturing Company, St. Paul, Minn.

[22] Filed: Nov. 14, 1973

[21] Appl. No.: 415,506

Related U.S. Application Data

[63] Continuation of Ser. No. 180,216, Sept. 12, 1971, which is a continuation-in-part of Ser. No. 76,982, Sept. 30, 1970, abandoned.

[52] U.S. Cl. .............. 428/96; 427/322; 427/372; 427/385; 428/394; 428/395
[51] Int. Cl.² ................ D03D 27/00; D06M 15/32
[58] Field of Search ............ 117/138.8 F, 139.5 A, 161 UZ, 117/139.5 C, 139.5 Q; 260/29.6 F; 161/67

[56] References Cited
UNITED STATES PATENTS

| | | | |
|---|---|---|---|
| 3,068,187 | 12/1962 | Bolstad et al. | 260/29.6 |
| 3,256,230 | 6/1966 | Johnson et al. | 260/29.6 |
| 3,256,231 | 6/1966 | Johnson et al. | 260/29.6 |
| 3,277,039 | 10/1966 | Marascia et al. | 260/29.6 |
| 3,382,097 | 5/1968 | Erby et al. | 117/141 |
| 3,398,182 | 8/1968 | Guenther et al. | 260/455 |
| 3,462,296 | 8/1969 | Reynolds et al. | 117/161 |
| 3,503,915 | 3/1970 | Peterson | 260/29.2 |
| 3,574,791 | 4/1971 | Sherman et al. | 117/139.4 |
| 3,645,989 | 2/1972 | Tandy | 260/80.73 |
| 3,657,173 | 4/1972 | Eanzel et al. | 260/29.6 F |
| 3,660,360 | 5/1972 | Ray-Chandhuri et al. | 260/78.5 E |

*Primary Examiner*—P. E. Willis, Jr.
*Attorney, Agent, or Firm*—Alexander, Sell, Steldt & DeLaHunt

[57] ABSTRACT

A durably soil-resistant carpet is provided which comprises a plurality of organic fibers having thereon a normally solid coating comprising (a) at least one phase of a water-insoluble addition polymer derived from a polymerizable ethylenically unsaturated monomer free of non-vinylic fluorine, the polymer having at least one major transition temperature higher than about 45° C. and a solubility parameter of at least about 8.5, and (b) at least one phase of a water-insoluble fluorinated component containing a fluoroaliphatic radical of at least 3 carbon atoms, the fluorinated component having at least one major transition temperature higher than about 45° C.; and at least one of said phases being a continuous phase. Novel compositions and processes for the treatment of carpets to render them durably soil resistant are also provided.

5 Claims, No Drawings

CARPET TREATING AND TREATED CARPET

This application is a continuation of our copending application Ser. No. 180,216, filed Sept. 12, 1971, which is a continuation-in-part of our copending application, Ser. No. 76,982, filed Sept. 30, 1970, now abandoned.

This invention relates generally to the treatment of carpets with fluoroaliphatic-radical-containing components and addition polymers derived from monomers free of non-vinylic fluorine to impart traffic-durable stain-repellent and soilresistant properties thereto.

The treatment of various textile fabrics with fluorochemicals to impart water and oil repellency has been known to those in the art for several years. For example, various fluorochemical compounds have been disclosed previously for use on textile fabrics made from natural fibers alone, such as wool, cotton, silk, etc., and also for use on textile fabrics made from natural fibers alone or in combination with certain synthetic fibers, e.g, nylon, polyester and rayon. Various fluorochemical have also frequently been used in conjunction with creaseresistant resins, hand modifiers, water repellants and the like to improve the fabric performance.

However, treatment with such fluorochemical compounds has not been useful or practical for all uses and has been especially impractical for treating fibers and fabrics which are subjected to severe abrasion during normal use. For example, the treatment of certain types of fibers, e.g., those of poly(ethyleneterephthalate), with fluorochemical is often impractical because the fiber surface is not durably receptive to such fluorochemicals. Thus the fluorochemical may often be removed easily by abrasion, laundering, dry cleaning, etc. Moreover conventional fluorochemical treatment of fibers and pile fabrics for carpet use has been quite impractical because of the severe abrasion to which such fibers and pile fabrics are subjected, the ability to resist soiling and staining being lost after a very short time.

It has been proposed by others, e.g., U.S. Pat. Nos. 3,068,187; 3,256,230; 3,256,231; 3,277,039, and 3,503,915, to mix fluorinated polymers with non-fluorinated polymers to obtain a mixture (in a water or solvent solution or dispersion) which will impart good water and oil repellency to textiles, paper and leather. As described in those references, by mixing a relatively inexpensive, non-fluorinated polymer with a fluoroaliphatic-containing polymer, one can obtain a relatively inexpensive textile fabric or fiber treating mixture which will impart water and oil repellency to the substrate. For economic reasons, those patents suggest using only a minor proportion of the fluoroaliphatic polymer in the mixture, i.e., the nonfluorinated polymer is primarily a diluent in the mixture.

Generally, attempts have been made by others with fluorochemical treatments to improve dry soil resistance of substrates, but such treatments are not durable to severe abrasion. Also, treatments proposed by others which resist abrasion tend to be receptive to dry soil under conditions of high compressive load. As a result, all of the prior art treatments satisfactory for apparel or upholstry fabrics failed to provide traffic-durable soil-resistance, particularly to dry soil, to rugs and carpets.

The present invention has an an aim and provides novel soil-resistant carpets and novel compositions and processes for the fluorochemical treatment of carpets, particularly pile carpets, to impart durable stain repelling and soil-resistant properties thereto. The fluorochemical treatment is useful for various types of carpets such as, for example, those having fibers of polyester, polyolefin, nylon, acrylic, modacrylic, wool, cotton, and mixtures thereof.

In accordance with the invention there is provided a treated carpet comprising a plurality of soil-resistant fibers comprising organic fibers having thereon a normally solid coating comprising (a) at least one phase comprising a water-insoluble addition polymer derived from a plymerizable ethylenically polymerizable monomer free of non-vinylic fluorine, the polymer having at least one major transition temperature higher than about 45° C. and a solubility parameter of at least about 8.5, (the polymer hereinafter referred to as "addition polymer" in the interest of brevity) and (b) at least one phase comprising a water-insoluble fluorinated component containing a fluoroaliphatic radical of at least 3 carbon atoms and having at least one major transition temperature higher than about 45° C.; at least one of said phases being a continuous phase.

The invention also provides novel compositions for the treatment of carpets to impart traffic-durable soil-resistant and stain-repelling properties thereto. The compositions comprise at least 0.1% solids in a liquid medium, the solids comprising a water-insoluble addition polymer derived from a polymerizable ethylenically unsaturated monomer free of nonvinylic fluorine, and a water-insoluble fluorinated component, i.e., compound or polymer, containing a fluoroaliphatic radical of at least 3 carbon atoms. Each of the addition polymer and the fluorinated component has at least one major thermal transition temperature higher than about 45° C. The ratio of fluorinated component to addition polymer is generally preferred to be 1:10 to 10:1. Generally, the preferred concentration of polymers in the composition is about 1–25% solids, although much higher concentration, e.g., 50% or more, may be useful depending upon the method used to treat the fibers or fabrics. In a most preferred embodiment, the compositions are substantially free (i.e., less than 10 weight percent) of polymers not having a major transition temperature higher than about 45° C. (e.g., polyisobutylene, polybutadiene and ethylenepropylene rubbers).

More specifically, the addition polymer is characterized as being normally non-rubbery (or curable to a non-rubbery state), non-tacky, normally solid, water-insoluble, and preferably free of ethylenic or acetylenic unsaturation. Water-insolubility is required to provide durability to the normal cleaning operations such as shampooing. In order to be resistant to soil under high compressive load, especially particulate soil, the addition polymer must have at least one major transition temperature above about 45° C. which is a melting point or glass transition in which the polymer becomes significantly softer as the temperature is raised. Transitions are characteristically glass temperature (Tg) or crystalline melting points (Tm), such as are usually detected by DTA (differential thermal analysis) or thermomechanical analysis (TMA). While suitable materials may have, for example, glass transitions at relatively low temperatures such as $-25°$ C. to 0° C., the polymer must have at least one major transition point above about 45°C.

The addition polymers may be prepared from suitable monomers such as vinyl fluoride, vinylidene fluoride, vinyl chloride, vinylidene chloride, styrene, alpha-methyl styrene, lower alkyl methacrylates, and glycidyl acrylate and methacrylate. Such monomers can be polymerized or copolymerized with each other or with minor amounts, e.g., 0.5 to 45% of additional monomers to provide or improve particular desired physical or chemical properties, e.g., flexibility, substantivity, surface conductivity, etc. Representative of such additional monomers are vinyl acetate, vinyl pyridine, alkyl acrylates or methacrylates hydroxy lower alkyl acrylates and methacrylates, acrylamide and methacrylamide, N-methylol acrylamide, itaconic acid and maleic anhydride. The amounts of such additional monomer used must, of course, not be so great as to impart water solubility to the addition polymer. Also, at least one major transition temperature of the addition polymer must remain above about 45° C. Polymerization may be accomplished in bulk, solution, suspension or emulsion systems by any of the usual polymerization agents, such as gamma radiation, actinic radiation, organic or inorganic peroxides, azobisalkylnitriles, anionic or cationic agents, and the like.

The fluorinated component which is a polymer is an addition or condensation polymer, including copolymer, obtained by polymerizing, either alone or in conjunction with compatible monomers free of fluoroaliphatic radicals, one or more monomers of the formula $R_fP$ where $R_f$ is a fluorinated aliphatic radical and P is a polymerizable group. Preferably P is an ethylenically unsaturated moiety polymerizable, or copolymerizable, by free radical initiation, electron irradiation, ionic initiation, or the like. $R_fP$ may also be a fluoroaliphatic-radical-containing dicarboxylic acid, glycol, diamine, hydroxyamine, etc., copolymerizable with a diisocyanate, glycol, diacyl halide, etc. Fluorinated copolymers may be random, alternating, or segmented.

Generally, such polymers as well as other fluorinated compounds used in the invention should contain at least 25 percent by weight of fluorine in the form of fluoroaliphatic radicals. A molecular weight of at least about 20,000 generally is preferred for the polymers and copolymers to provide durable non-tacky surface characteristics, although crystalline polymers with molecular weights as low as 3,000 are useful and fluoroaliphatic-radical-containing compounds of substantially lower molecular weight such as those described by Guenthner and Lazerte, U.S. Pat. No. 3,398,182 and U.S. Pat. No. 3,484,281 are also useful fluorinated components in the invention. The important criteria for the fluoroaliphatic component are those of fluorine content and transition point.

The fluorinated aliphatic radical $R_f$ is a fluorinated, preferably saturated, monovalent, non-aromatic, aliphatic radical of at least three carbon atoms. The chain may be straight, branched, or if sufficiently large, cyclic, and may be interrupted by divalent oxygen atoms or trivalent nitrogen atoms bonded only to carbon atoms. A fully fluorinated group is preferred, but hydrogen or chlorine atoms may be present as substituents in the fluorinated aliphatic radical provided that not more than one atom of either is present in the radical for every two carbon atoms, and that the radical must at least contain a terminal perfluoromethyl group. "Terminal" in the case of a polymer refers to the position in the skeletal chain of the radical furthest removed from the backbone chain. Preferably, the fluorinated aliphatic radical contains not more than 20 carbon atoms because such a large radical results in inefficient use of the fluorine content.

Representative $R_fP$ reactants include:

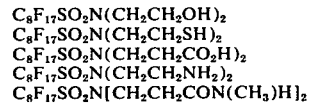

$C_8F_{17}SO_2N(CH_2CH_2OH)_2$
$C_8F_{17}SO_2N(CH_2CH_2SH)_2$
$C_8F_{17}SO_2N(CH_2CH_2CO_2H)_2$
$C_8F_{17}SO_2N(CH_2CH_2NH_2)_2$
$C_8F_{17}SO_2N[CH_2CH_2CON(CH_3)H]_2$

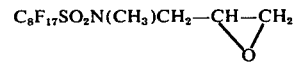

$C_8F_{17}SO_2N(C_4H_9)CH_2CHOHCH_2OH$
$C_8F_{17}SO_2NH_2$

Members of each series wherein the fluorinated group is from $C_3F_7$ to about $C_{20}F_{41}$ are also suitable without the extended enumeration of each.

The above materials may be modified, for example, by converting the diol to the diisocyanate or to the diacrylate, as shown below:
$C_8F_{17}SO_2N(C_2H_4O_2CCH=CH_2)_2$

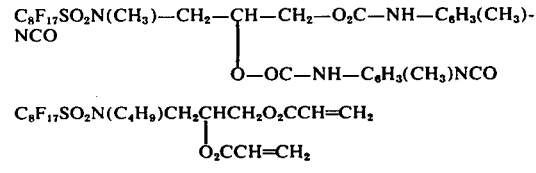

$C_8F_{17}SO_2N(C_4H_9)CH_2CHCH_2O_2CCH=CH_2$
$\quad\quad\quad\quad\quad\quad\quad\quad\quad | $
$\quad\quad\quad\quad\quad\quad\quad\quad\quad O_2CCH=CH_2$ Ethylenically unsaturated materials suitable for providing fluoroaliphatic radical-containing structural units by polymerization mechanism including free radical, cationic, and anionic process include:
$C_5F_{11}CH_2O_2CC(CH_3)=CH_2$
$C_7F_{15}CH_2O_2CC(CH_3)=CH_2$
$C_9F_{19}CH_2O_2CCH=F_2$
$C_8F17SO_2N(C_2H_5)C_2H_4O_2CC(CH_3)=CH_2$
$C_8F_{17}SO_2N(CH_3)C_2H_4O_2CCH=CH_2$
$C_8F_{17}CON(C_2H_5)C_2H_4O_2CC(CH_3)=CH_2$
$C_8F_{17}C_2H_4O_2CC(CH_3)=CH_2$
$C_8F_{17}SO_2N(CH_3)COC(CH_3)=CH_2$
$C_8F_{17}C_2H_4O_2CCH=CHCO_2C_2H_4C_8F_{17}$ Such monomers can be polymerized or copolymerized with each other or with minor amounts, e.g., 0.5 to 45% of additional monomers, including non-fluorinated monomers, to provide or improve particular desired physical or chemical properties, provided that at least one major transition temperature of the polymer remains above about 45° C.

Representatives of other fluorinated monomers which may be used include:
$C_8F_{17}SO_2N(C_2H_5)C_2H_4COOCH=CH_2$
$C_7F_{15}C_3H_6COOCH=CH_2$
$C_4F_8COOCH_2CH=CH_2$
$C_8F_{17}SO_2N(C_2H_5)COCH=CH_2$
$C_8F_{17}SO_2N(CH_3)C_{11}H_{22}O_2CNH(C_6H_3\text{-}CH_3)NHCO_2C_2H_4O_2CC(CH_3)=CH_2$
$C_7F_{15}CH_2O_2CCH=CHCO_2CH_2C_7F_{15}$
$C_3F_7CH_2O_2CCF=CH_2$
$C_3F_7CH_2O_2CCF=CF_2$
$(C_3F7)_3CCH_2O_2CCH=CH_2$
$C_8F_{17}(CH_2)_3O_2CCH=CH_2$
$C_8F_{17}COCH_2CH_2O_2CCH=CH_2$
$C_8F_{17}(CH_2)_{11}O_2CC(CH_3)=CH_2$
$C_8F_{17}SO_2CH_2CH_2O_2CCH=CH_2$
$C_8F_{17}SOCH_2CH_2O_2CCH=CH_2$
$C_8F_{17}CON(C_2H_5)(CH_2)_2O_2CC(CH_3)=CH_2$
$C_{12}F_{25}SO_2NH(CH_2)_{11}O_2CC(CH_3)=CH_2$
$C_{12}F_{25}SO_2C_6H_4CH=CH_2$
$C_8F_{17}SO_2N(CH_3)CH_2CH_2CH_2OCH=CH_2$
$CF_3C(CF_2H)F(CF_2)_{10}CH_2O_2CCH=CH_2$
$CF_3C(CF_2Cl)F(CF_2)_{10}(CH_2)_2O_2CCH=CH_2$

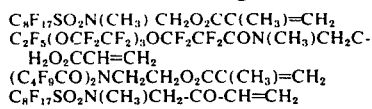

$$C_2F_5CF\begin{matrix}CF_2-CF_2\\CF_2-CF_2\end{matrix}NCF_2CF_2CON(CH_3)CH_2CH_2O_2CCH=CH_2$$

$$C_2F_5CF\begin{matrix}CF_2-CF_2\\CF_2-CF_2\end{matrix}CFCF_2CF_2SO_2N(CH_3)CH_2CH_2O_2CCH=CH_2$$

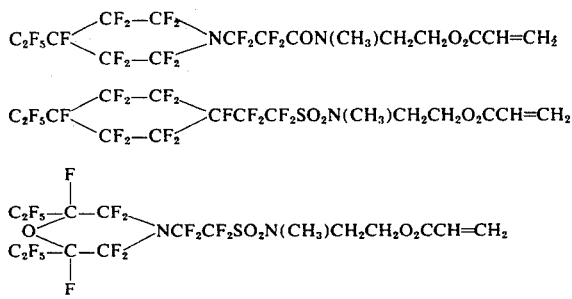

Fluorinated compounds which are employed include as particular examples fluoroaliphatic group containing urethanes as described by U.S. Pat. No. 3,484,281 having melting points above 45° C. and usually up to about 250° C. such as

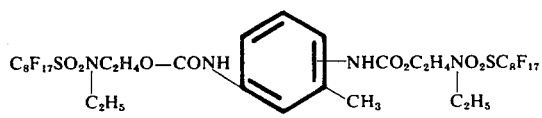

Illustrative of other fluoroaliphatic components are:
$C_{12}F_{25}C_2H_4OH$
and

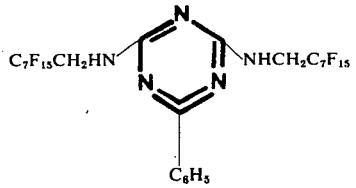

It has been found that both the fluorinated component and the addition polymer must be non-tacky and non-rubbery in order to prevent soil, especially particulate soil, from becoming embedded in the coating formed by these polymers. It will be recognized that fluorinated compounds, as herein used, also possess these characteristics. While highly crosslinked addition and fluorinated polymers may be used, they are generally too rigid for durable surface coatings, but low levels of crosslinking may be desirable to increase hardness and decrease solubility. Such crosslinks may be present in the polymer prior to application to the fiber or fabric or may be subsequently induced by known chemical reaction, thermal treatment, or radiation. Additionally, it has been found that the fluorinated compound or polymer and the addition polymer are sufficiently immiscible in, or incompatible with, each other that two phases are always formed when these polymers are applied to a substrate. One of the phases comprises the fluorinated component and the other phase comprises the addition polymer. Additionally, at least one of the phases is a continuous phase. Without being bound by any particular theory, it is believed that a coating, e.g., on a fiber, comprising the fluorinated component and the addition polymer may contain, for example, a continuous phase of the fluorinated component while the addition polymer is a discontinuous phase of particles dispersed throughout the continuous phase. It is further believed that the continuous phase may comprise the addition polymer while the fluorinated component is a discontinuous phase of particles dispersed throughout the continuous phase. Applicants also believe that there may be two continuous phases, wherein the addition polymer forms a film on the substrate, e.g., a fiber, while the fluorinated polymer or compound forms a film on the surface of the addition polymer film or the two may form intergrown networks.

The invention will now be further illustrated by means of the following examples, wherein all parts and percentages are by weight unless otherwise expressed.

EXAMPLE I

A suitable addition polymer, useful in accordance with the invention, of 90:7:3/vinylidene chloride:-methyl acrylate: itaconic acid was prepared in a glass-lined kettle equipped for vacuum draws, heating, cooling and agitation. After 180 parts of deionized water were added to the kettle, it was purged of oxygen by alternately reducing the pressure to about 25mm. Hg, with agitation, and re-pressurizing to 750 mm. Hg with nitrogen. With agitation, 2 parts of sodium dodecyl benzene sulfonate emulsifier was added to the kettle and mixing was continued for 30 minutes. Itaconic acid 3 parts, $Na_2HPO_4$, 1 part; $NaHSO_3$, 0.06 parts; $(NH_4)_2S_2O_8$, 0.15 parts, were then added and the kettle mixture was heated, with agitation, to 35°–40°C. Vinylidene chloride, 90 parts, was then added over a 10 minute period, followed by the addition of 7 parts of methyl acrylate over a 30 minute period. After 10 hours of agitation at 35–40°C., a solution of 0.2 parts emulsifier, 0.12 parts $NaHSO_3$ and 0.30 parts $(NH_4)_2S_2O_8$ in 5 parts of deionized, deoxygenated water was added. Agitation and heating at 35°–40°C. were continued for 4 hours. The kettle contents were then cooled to 30° C. and drained through a 30 micron filter. Analysis indicated a 93% yield of emulsion polymer having a Tm of 130° C.

EXAMPLE III

A suitable fluorinated polymer, useful in accordance with the invention, was prepared from a fluoroaliphatic-radical-containing monomer of the formula $C_8F_{17}SO_2N(CH_3)$-$C_2H_4O_2CCH=CH_2$ (90 parts) and butyl acrylate (10 parts).

To a three neck glass reaction flask equipped with agitator, thermometer and condenser were added 90 parts of the fluoroaliphatic-radical-containing monomer, 10 parts butyl acrylate, 230 parts methyl isobutyl ketone and 2 parts benzoyl peroxide. The flask contents were then heated, with agitation, to 85° C. for 16 hours after which the fluorinated polymer was obtained.

An emulsion was then prepared using 330 parts of the fluorinated polymer solution (from the reaction flask above), 345 parts deionized water and 5 parts emulsifier ($C_8F_{17}SO_2NHC_3H_6N^+(CH_3)_3Cl^-$) according to the following procedure. Emulsifier (2.5 parts) was added to the water and a like amount of emulsifier was added to the polymer solution. The water and the polymer solution were then heated to about 80° C. after which the water was added to the polymer solution with high shear agitation. The resulting mixture was then homogenized to form a relatively stable emulsion.

Because of the presence of the cationic emulsifier in the emulsion so prepared, the emulsion is cationically charged. However, it is also possible to provide similar emulsions which are oppositely charged by simply using an anionic emulsifier, e.g., $C_8F_{17}SO_2N(C_2H_5)CH_2CO_2K$.

In addition to the solution polymerization of the fluorinated polymers, it is also possible to provide such polymers through emulsion polymerization.

The process of treating carpets to render them soilresistant and stain-repellent comprises coating such materials with the compositions of the invention so as to effect a dry pickup of between 0.04 and 25% by weight of the carpet face pile of total solids, the pickup being equivalent to at least about 0.03% (and preferably in the range of 0.03 – 10%) by weight of face pile of the fluorinated polymer, and then heating the retained polymers at 60° – 175° C. for about 1 to 20 minutes.

The fluorinated polymer and the addition polymer may be mixed either in a water or solvent medium (water being preferred) and are generally used in a low percent solids, e.g., 0.5 – 10%, dispersion when treating the carpets. The ration of fluorinated polymer to addition polymer may vary from about 1:10 to 10:1.

Carpets treated with the novel compositions have thereon a long-lasting, soil- and stain-resistant coating which will remain effective even after several washings or dry cleanings and which will survive severe abrasion. This result has not heretofore been possible with conventional treatment.

It is also possible to achieve similar results by first coating the carpet with a dispersion or solution of the addition polymer and then subsequently coating with a solution or dispersion of the fluorinated polymer. This two-step application of polymers imparts similar oil repellency and soil resistance to the carpet as is imparted by the co-application of similar polymers.

The advantages of treating carpets with compositions of the invention are more particularly illustrated by way of the following examples.

In each of the examples the treated carpets were initially tested for resistance to oil using the Hydrocarbon Resistance Test (AATCC 118 - 1966T) and they also were subjected to an AQ test. The AQ test comprises placing a drop of 80:20/water:isopropanol on the test carpet and observing whether the drop is absorbed by the carpet. If the drop is absorbed, the carpet treatment is given a fail rating. After these initial tests, all of the treated carpets were subjected to a Walk-on test (AATCC 122-1967T) for evaluation of the treatment.

EXAMPLE III

To compare the durability (to soiling) of carpets treated with a composition of the invention and carpets treated only with a fluorinated polymer, several loop pile, undyed polyester fiber carpets, 30 ounce pile/sq.yd., were treated at 25% wet pickup by weight of face pile with a water dispersion containing only a fluorinated polymer while several similar carpets were treated at 25% wet pickup with a composition of this invention. The carpets and the treating compositions were identified as follows:

Lot 1 -Control carpets (untreated).

Lot 2 - Carpets treated with a 1.6% solids water dispersion comprising the fluorinated copolymer of Example II.

Lot 3 -Carpets treated with a 2.0% solids water dispersion comprising (a) the fluorinated polymer (1.6% solids) of Example II and (b) a vinylidene chloride copolymer (0.4% solids) sold under the tradename E-216 (Rohm and Haas), having a crystalline melting temperature (Tm) of 130° C., a solubility parameter of at least 8.5 and being in other respects very similar to the addtion polymer prepared in Example I.

Lots 2 and 3 were respectively treated by overhead spraying, drying at 70° C. and atmospheric pressure for 15 minutes to remove the water, and then heating at 150° C. for 4 minutes.

Initial oil repellency tests indicated that the Lot 3 carpets were superior to those of Lot 2 which in turn were superior to those of Lot 1. Lot 2 and 3 carpets passed the AQ test while Lot 1 carpets failed.

All of the carpets were then subjected to the Walk-on Test for 30,000 footsteps. It was observed that the Lot 3 carpets were visibly cleaner than Lot 2 carpets which in turn were cleaner than Lot 1 carpets. All of the carpets were then cleaned with a commercial rug shampoo ("Glory", a trademark product of S. C. Johnson, Inc.) and then subjected to another Walk-on Test of 15,000 footsteps, after which the carpets were again visually tested for soil pickup.

The visual rating of the carpets follows a relative rating scale ranging from −8 to +8 according to the following system:

| Rating | Significance |
|---|---|
| −8 | Carpet is completely black with soil; no soil resistance |
| 0 | Represents amount of soil retained during test by a control (i.e. untreated) carpet; almost no soil resistance. |
| +2 | Represents fair soil resistance. |
| +4 | Represents good soil resistance. |
| +6 | Represents excellent soil resistance. |
| +8 | Represents a completely unsoiled carpet. |

The results of the visual rating of Lots 1, 2 and 3 carpets are compiled in Table I.

Table I

| | Visual Ratings | |
|---|---|---|
| Lot | 30,000 footsteps | 30,000 footsteps + shampoo + 15,000 footsteps |
| 1 | 0 | 0 |
| 2 | +3 | +2 |
| 3 | +6 | +4 |

Similar results are obtained when the carpet is treated first with a solution or dispersion of the addition polymer and then is treated with a solution or dispersion of the fluorinated polymer. Similar results are also obtained when the ratio of fluorinated polymer to addition polymer is higher, or lower, than that used in Example III.

EXAMPLE IV

Various treating compositions were prepared for the treating of acrylic fiber carpets. The addition polymer used in each of the compositions of this example is the same commercial addition polymer used in the composition for treating Lot 3 carpets in Example III. The fluorinated polymers used in the compositions of this example are fluorinated polymers prepared in accordance with Example II and using the same monomers in varying amounts but using $C_8F_{17}SO_2N(C_2H_5)CH_2CO_2K$ as the emulsifier. As shown in Table II, the major thermal transition temperature of the resulting fluorinated polymer is correspondingly lowered by increasing the amount of butyl acrylate in the polymer.

The compositions prepared were each applied to acrylic fiber carpets using overhead spraying to provide a wet pickup of 25% by weight of face pile. The treated carpets were then dried for 15 minutes at 70° C. and atmospheric pressure and then were cured for 4 minutes at 130° C.

The test results, both initially and after 7,700 footsteps, are compiled in Table II.

EXAMPLE V

A series of compositions were prepared for treating carpets using the fluorinated polymer of Example IV (Tm = 78° C.) which contained 10% butyl acrylate, and a variety of addition polymers. Additionally, some carpets were treated sequentially first with an addition polymer, dried and cured, and then were treated with the fluorinated polymer, dried and cured.

In the sequential treatment, the addition polymer was dried for 15 minutes at 70° C. and then was cured for 4 minutes at 100° C. The fluorinated polymer was similarly dried and then cured for 4 minutes at 130° C. In coapplication of polymers, the carpet was dried for 15 minutes at 70° C. and cured for 4 minutes at 130° C.

The data are summarized in Table III, wherein the concentration of fluorinated polymer in the treating composition was 1.6%.

EXAMPLE VI

A composition was prepared with the fluorinated polymer of Example II present in amount of 1.6% by weight. The addition polymer used was the vinylidene chloride copolymer (Tm = 130° C.) of Example III, which was present in the composition in amount of 0.4% by weight.

Several acrylic fiber carpets were then treated with the above composition (co-application) while several other carpets were treated only with the fluorinated polymer (1.6% solids in bath). Another set of carpets was treated sequentially with the vinylidene chloride copolymer (0.4% solids in bath) and then with the fluorinated polymer, while still another set of carpets was treated sequentially with a poly(vinylidene chloride) addition polymer (Tm = 190° C.) and then with the fluorinated polymer.

The data are compiled in Table IV.

Table II

| Carpet Sample | Monomers* | Treating Fluorinated Major Thermal Transition Temperature | Composition Polymer Concentration in Composition (by wt.) | Concentration of addition polymer in composition (by wt.) | Initial AATCC 118 - 1966T Oil Rating | Initial AQ | After 7,700 footsteps AATCC 118-1966T Oil Rating | After 7,700 footsteps Visual Rating+ |
|---|---|---|---|---|---|---|---|---|
| 1 | 100:0/A:B | 105° C. Tm | 1.6% | 0.4% | 3 | Fail | 1 | + |
| 2 | 95:5/A:B | 92° C. Tm | 1.6% | 0.4% | 4 | Pass | 2 | +5 |
| 3 | 90:10/A:B | 78° C. Tm | 1.6% | 0.4% | 4 | Pass | 2.5 | +4 |
| 4 | 80:20/A:B | 58° C. Tm | 1.6% | 0.4% | 4.5 | Pass | 4 | +4 |
| 5 | 70:30/A:B | 47° C. Tm | 1.6% | 0.4% | 4 | Pass | 5 | +4 |
| 6 | 50:50/A:B | −32° C. Tg | 1.6% | 0.4% | 5 | Pass | 5 | −4 |
| 7 | 90:10/A:B | 78° C. Tm | 1.6% | 8.0% | 5 | Pass | 1.5 | +6 |
| 8 | 90:10/A:B | 78° C. Tm | 0.3% | 1.7% | 1.5 | Pass | 0 | +4 |
| 9 | 90:10/A:B | 78° C. Tm | 1.6% | 0.4% | 4.5 | Pass | 1.5 | +4 |
| 10 | — | — | 0% | 2.0% | 0 | Fail | 0 | +5 |
| 11 (Untreated) | | | | | 0 | Fail | 0 | 0 |

*A represents $C_8F_{17}SO_2N(CH_3)C_2H_4O_2CCH=CH_2$ and B represents butyl acrylate.
+Using the rating scale described in Example III.

TABLE III

| Carpet Sample | Addition Polymer | Major Transition Temperature, °C. | Concentration in Composition (wt. %) | Application* | Initial Oil rating | Initial AQ | After 8,400 footsteps Oil rating | After 8,400 footsteps Visual Rating |
|---|---|---|---|---|---|---|---|---|
| 1 | — | — | 0 | — | 3 | Fail | 3 | +2 |
| 2 | from Example I | Tm 130 | 0.4 | Co | 4 | Pass | 2 | +5 |
| 3 | from Example I | Tm 130 | 0.4 | Pre | 5 | Pass | 3.5 | +6 |
| 4 | VCl₂ copolymer of Example III | Tm 130 | 0.2 | Co | 4 | Pass | 3 | +4 |
| 5 | VCl₂ copolymer of Example III | Tm 130 | 0.8 | Co | 5 | Pass | 1 | +5 |
| 6 | VCl₂ copolymer of Example III | Tm 130 | 1.6 | Co | 5 | Pass | 1 | +6 |
| 7 | VCl₂ copolymer of Example III | Tm 130 | 3.2 | Co | 5 | Pass | 1 | +6 |
| 8 | VCl₂ copolymer of Example III | Tm 130 | 8.0 | Co | 3 | Pass | 0 | +5 |
| 9 | VCl₂ copolymer of Example III | Tm 130 | 0.32 | Pre | 5 | Pass | 3 | +6 |
| 10 | VCl₂ copolymer of Example III | Tm 130 | 1.6 | Pre | 5.5 | Pass | 3 | +6 |
| 11 | VCl₂ copolymer of Example III | Tm 130 | 8.0 | Pre | 6 | Pass | 3.5 | +7 |

TABLE III — Continued

| Carpet Sample | Addition Polymer | Major Transition Temperature, °C. | Concentration in Composition (wt. %) | Application* | Carpet Tests Initial Oil rating | AQ | After 8,400 footsteps Oil rating | Visual Rating |
|---|---|---|---|---|---|---|---|---|
| 12 | poly(glycidyl methacrylate) | Tg 52 | 0.4 | Co | 4 | Pass | 2 | +5 |
| 13 | poly(styrene) | Tg 100 | 0.4 | Co | 4 | Pass | 3 | +5 |
| 14 | poly(methyl methacrylate | Tg 105 | 0.4 | Co | 5 | Pass | 3 | +5 |

*"Pre" denotes sequential treatment; "Co" denotes co-application.

EXAMPLE VII

The fluorinated polymer of Example II was used in preparing several treating compositions in which several addition polymers were evaluated. Most of the addition polymers used in this example did not have a major thermal transition temperature above about 45° C.

The compositions were applied to acrylic fiber carpets by overhead spraying and the carpets were then dried for 15 minutes at 70° C. followed by a cure for 4 minutes at 130° C.

The data are compiled in Table V.

The concentration of the fluorinated polymer in the bath was 1.6 weight percent for all examples. As in all other examples, the wet pickup of the treating composition was 25% by weight of face pile.

EXAMPLE VIII

Methyl methacrylate was homopolymerized to serve as an addition polymer. A vessel was charged with 36.4 parts of water, 4.6 parts of methyl methacrylate monomer (10% of total) and 13.8 parts of a 25% solution of cetyl dimethyl benzyl ammonium chloride and the emulsion heated to 50° C. A solution of 0.2 parts potassium persulfate in 3.6 parts of water was then added and, after about 3–5 minutes, polymerization was proceeding, thereby raising the temperature, which was brought to 75° C. as rapidly as possible. A further 41.4 parts (90% of total) of methyl methacrylate was added gradually over 1½ to 2 hours while maintaining 75° C. during addition and for 2 to 4 hours thereafter. The emulsion of polymethylmethacrylate was 93.8 g. and contained 45.4% of solids. This emulsion was used in treatment Nos. 2, 4, 6 and 7 in Table VI in which various fluoroaliphatic-radical-containing components are used both with and without an addition polymer in tests as described hereinabove on both loop pile nylon and acrylic carpets. It will be evident that those carpets in which a treatment according to the invention was applied (Nos. 2, 4 and 6) gave superior results and that the benefits were substantially retained after shampooing. This demonstrates the benefits of the balance of properties achieved in compositions of the invention.

EXAMPLE IX

A bis-urethane fluoroaliphatic-radical-containing component for carpet treatment was prepared from 554 parts of N-ethyl perfluorooctanesulfonamidoethanol. A solution of this alcohol in 337 parts of methyl isobutyl ketone was dried of water by distilling to remove 100 parts of solvent and was then cooled to 80° C. To this solution was added 87 parts of tolylene diisocyanate and then very slowly 0.32 parts of dibutyltin dilaurate as the exothermic reaction permitted. The reverse procedure of adding the catalyst first and the diisocyanate gradually is also satisfactory. After reaction, an emulsion is prepared in a dispersion of 489 parts of water containing a solution of 16 parts of fluoroaliphatic surfactant, $C_8F_{17}SO_2NHC_3H_6N^+(CH_3)_3Cl^-$, in 16 parts acetone and 48 parts water and 16 parts of polyoxyethylene sorbitan monooleate (Tween 80) by putting the total dispersion through an homogenizer (Manton Gaulin) at 2500 pounds per square inch and 75° C. The 45% solid-content emulsion is used in Treatments Nos. 1 and 2 of Table VI. The solid has a melting point of 110°– 125°C.

EXAMPLE X

A polymeric urethane fluoroaliphatic-radical-containing component for carpet treatment was prepared from 150 parts of N,N-bis(hydroxyethyl)perfluorooctanesulfonamide which was dried of water by first dissolving in 552 parts of butyl acetate in a suitable vessel and then distilling to remove 200 parts of butyl acetate. The solution was cooled to 80° C. and 0.8 parts of triethylene diamine and 43.5 parts of tolylene diisocyanate added and the solution heated at 90° C. for 16 hours. Infra red absorption spectroscopy showed no absorption due to isocyanate groups. Dried polymer had a Tm of 75°– 85° C.

The above solution was emulsified in 500 parts of distilled water with 9.7 parts polyoxyethylene sorbitan monoleate and 48.5 parts of the same solution of $C_8F_{17}SO_2NHC_3H_6N^+(CH_3)_3Cl^-$ used in Example IX by first running the latter aqueous mixture into the butyl acetate solution of polymer while mixing on an Eppenbach Homomixer to give an emulsion which was then run through a Manton Gaulin homogenizer at 2500 pounds per square inch as in Example IX. This emulsion contained 19.2% solids and was used in Treatments Nos. 3 and 4 of Table VI.

EXAMPLE XI

Another type of fluoroaliphatic-radical-containing component was prepared from 44.8 parts of $C_8F_{17}SO_2N(C_2H_5)(C_2H_4NH)_3H$ in 50.0 parts of acetone at 10° C. by slowly adding 11.0 parts of cyanuric chloride dissolved in 100 parts of acetone and maintaining the temperature of 10° C. throughout the addition. The suspension was then stirred for 15 minutes at about 18° C. and the precipitate recovered by filtration. Further product was recovered by evaporation acetone.

A solution of 1.6 parts of the above material having the structure:

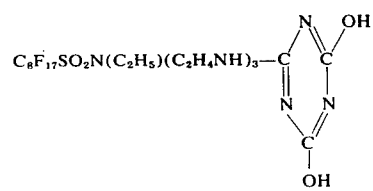

and decomposition point at about 294° C. is made in 86.4 parts water and 12 parts acetone and used in Treatment Nos. 5 and 6 in Table VI.

In accordance with the invention, a variety of other types of carpets may also be treated. For example, various carpet fibers such as polyamide, modacrylic, wool, cotton, or mixtures of these, may be rendered soil-resistant under conditions of heavy foot traffic with the compositions and methods of the invention.

Table IV

| Carpet Sample | Addition Polymer | Application | Carpet Tests | | | |
|---|---|---|---|---|---|---|
| | | | Initial | | After 8400 Footsteps | |
| | | | Oil rating | AQ | Oil rating | Visual |
| 1 | — | * | 3 | Fail | 4 | +3 |
| 2 | vinylidene chloride copolymer | Co | 4 | Pass | 3 | +5 |
| 3 | vinylidene chloride copolymer | Pre | 4 | Pass | 3.5 | +6 |
| 4 | poly(vinylidene chloride) | Pre | 5 | Pass | 3 | +6 |

*Carpet treated only with fluorinated polymer.

Table V

| Carpet Sample | Addition Polymer | Major thermal transition temperature° C. | Concentration of addition polymer in composition (wt. %) | Carpet Tests | | | |
|---|---|---|---|---|---|---|---|
| | | | | Initial | | After 17,500 Footsteps | |
| | | | | Oil Rating | AQ | Oil Rating | Visual Rating |
| 1** | — | — | 0 | 3 | Fail | 3 | +2 |
| 2 | vinylidene chloride copolymer of Example III | Tm 130 | 1 | 5 | Pass | 2 | +4 |
| 3 | cross-linkable acrylic* | Tg −24 | 0.4 | 3 | Fail | 0 | +1 |
| 4 | poly(ethylhexylmethacrylate) | Tg below −10 | 0.4 | 3 | Pass | 1 | +1 |
| 5 | poly(isoprene) | Tg below −50 | 0.4 | 3 | Fail | 1 | +1 |

*Sold under the tradename "Rhoplex HA-8" (from Rohm and Haas).
**This carpet was treated only with the fluorinated polymer (from a 1.6% bath).

Table VI

| | Treatment | | | Carpet Tests | | | | |
|---|---|---|---|---|---|---|---|---|
| | Fluorinated | Addition | | Initial | | After 6000 Footsteps (factory location) | | |
| No. | Component | Polymer | Carpet | Oil Rating | AQ | Oil Rating | Visual Rating | shampooed first* |
| 1 | 1.6% product of Example IX | none | LPN** | 4.5 | Pass | 5 | 0 | 0 |
| | | | LPA*** | 4 | Pass | 5 | 0 | 0 |
| 2 | 1.6% product of Example IX | 3.2% polymethyl methacrylate | LPN | 5 | Pass | 6 | +6 | +4 |
| | | | LPA | 4 | Pass | 5 | +5 | +5 |
| 3 | 1.6% product of Example X | none | LPN | 4.5 | Pass | 4.5 | +2 | +1 |
| | | | LPA | 4 | Pass | 3 | 0 | +1 |
| 4 | 1.6% product of Example X | 3.2% polymethyl methacrylate | LPN | 4.5 | Pass | 4 | +7 | +5 |
| | | | LPA | 3 | Pass | 4 | +6 | +5 |
| 5 | 1.6% product of Example XI | none | LPN | 2 | Fail | 0 | +4 | +2 |
| | | | LPA | 3 | Fail | 0 | +4 | +2 |
| 6 | 1.6% product of Example XI | 3.2% polymethyl methacrylate | LPN | 2 | Fail | 0 | +5 | +4 |
| | | | LPA | 3 | Fail | 0 | +5 | +4 |
| 7 | none | 4.8% polymethyl methacrylate | LPN | 0 | Fail | 0 | +2 | 0 |
| | | | LPA | 0 | Fail | 0 | +2 | 0 |

*Shampooed first with a commercially available ("Blue Lustre") rug shampoo using Hoover home-type rug shampoo machine and air dried, then walked on.
**Loop Pile Nylon
***Loop Pile Acrylic The embodiments of the invention in which an exclusive property or privilege is claimed are defined as follows:

1. A durably soil-resistant carpet having a plurality or organic fibers with a normally solid coating thereon comprising:
   a. at elast one phase of water-insoluble addtion polymer derived from polymerizable ethylenically unsaturated monomer free of monvinylic fluorine, said polymer having at least one major transition temperature higher than about 45° C. and a solubility parameter of at least about 8.5, and
   b. at least one phase of water-insoluble fluorinated component containing fluoroaliphatic radical of at least 3 carbon atoms, said fluorinated component comtaining at least 25 percent by weight of fluorine in the form of fluoroaliphatic radicals and having at least one major transition temperature higher than about 45° C., at least one of said phases being a continuous phase and the respective weights of said phases being in a ratio of from 1:10 to 10:1.

2. A durably soil-resistant carpet in accordance with claim 1, wherein said organic fibers are in the form of a pile.

3. A durably soil-resistant carpet in accordance with claim 1, wherein said organic fibers are synthetic.

4. A durably soil-resistant carpet in accordance with claim 3, wherein said organic fibers are selected from the group consisting of polyester, acrylic and polyamide fibers.

5. A process for rendering carpet surfaces durably soilresistant, the process comprising the steps of: a. contacting the carpet surface with a liquid composition comprising, in weight ratio of from 1:10 to 10:1,
   1. water-insoluble addition polymer derived from polymerizable ethylenically unsaturated monomer free of non-vinylic fluorine, said polymer having at least one major transition temperature higher than about 45° C. and a solubility parameter of at least 8.5 and
   2. water-insoluble fluorinated component containing fluoroaliphatic radical of at least 3 carbon atoms, said fluorinated component containing at least 25 percent by weight of fluorine in the form of fluoroaliphatic radicals and having at least one major transition temperature higher than about 45° C., said composition being substantially free of polymers not having a major transition temperature higher than about 45° C., said liquid composition being applied in an amount to effect a retention of at least about 0.03% by weight of said fluorinated polymer by weight of surface pile of said carpet surface and
   b. drying said carpet surface.

* * * * *

UNITED STATES PATENT AND TRADEMARK OFFICE
CERTIFICATE OF CORRECTION

PATENT NO. : 3,916,053                     Page 1 of 2

DATED     : October 28, 1975

INVENTOR(S) : Sherman et al.

It is certified that error appears in the above-identified patent and that said Letters Patent are hereby corrected as shown below:

Column 1, line 12, "soilresistant" should read as -- soil-resistant -- .

Column 1, line 23, "creaseresistant" should read as -- crease-resistant -- .

Column 2, line 11, "plymerizable" should read as -- polymerizable -- .

Column 4, line 39, "$C_9F_{19}CH_2O_2CCH=F_2$" should read as -- $C_9F_{19}CH_2O_2CCH=CH_2$ -- .

Column 4, line 40, "$C_8F17SO_2N(C_2H_5)C_2H_4O_2CC(CH_3)=CH_2$" should read as -- $C_8F_{17}SO_2N(C_2H_5)C_2H_4O_2CC(CH_3)=CH_2$ -- .

Column 4, line 60, "$(CH_3F7)_3CCH_2O_2CCH=CH_2$" should read as -- $(C_3F_7)_3CCH_2O_2CCH=CH_2$ -- .

Column 6, line 45, "III" should read as -- II -- .

Column 6, lines 47-48, "fluoroaliphaticradical" should read as -- fluoroaliphatic-radical -- .

Column 7, lines 12-13, "soilresistant" should read as -- soil-resistant -- .

UNITED STATES PATENT AND TRADEMARK OFFICE
CERTIFICATE OF CORRECTION

PATENT NO. : 3,916,053
DATED : October 28, 1975
INVENTOR(S) : Sherman et al.

It is certified that error appears in the above-identified patent and that said Letters Patent are hereby corrected as shown below:

Column 15, line 8, "elast" should read as -- least -- .

Column 15, line 10, "monvinylic" should read as -- nonvinylic -- .

Column 16, line 5, "soilresistant" should read as -- soil-resistant -- .

Signed and Sealed this

Seventh Day of October 1980

[SEAL]

Attest:

SIDNEY A. DIAMOND

Attesting Officer

Commissioner of Patents and Trademarks